US012683413B2

(12) United States Patent
Xue

(10) Patent No.: US 12,683,413 B2
(45) Date of Patent: Jul. 14, 2026

(54) MULTIPLE PORT POWER SUPPLY SYSTEM

(71) Applicant: UT-Battelle, LLC, Oak Ridge, TN (US)

(72) Inventor: Lingxiao Xue, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 856 days.

(21) Appl. No.: 18/095,765

(22) Filed: Jan. 11, 2023

(65) Prior Publication Data

US 2023/0231392 A1 Jul. 20, 2023

Related U.S. Application Data

(60) Provisional application No. 63/299,517, filed on Jan. 14, 2022, provisional application No. 63/299,511, filed on Jan. 14, 2022.

(51) Int. Cl.
| | |
|---|---|
| *H02J 7/00* | (2026.01) |
| *H02J 7/50* | (2026.01) |
| *H02J 7/56* | (2026.01) |
| *H02M 7/155* | (2006.01) |
| *H02M 1/15* | (2006.01) |
| *H02M 7/06* | (2006.01) |

(52) U.S. Cl.
CPC ............... *H02J 7/56* (2026.01); *H02J 7/575* (2026.01); *H02M 7/155* (2013.01); *H02M 1/15* (2013.01); *H02M 7/06* (2013.01); *H02M 7/1555* (2013.01)

(58) Field of Classification Search
USPC .......................................................... 320/137
See application file for complete search history.

(56) References Cited

U.S. PATENT DOCUMENTS

| | | | |
|---|---|---|---|
| 9,161,422 B2 | 10/2015 | Alexandrov | |
| 10,566,829 B2 | 2/2020 | Tian et al. | |
| 2015/0381067 A1* | 12/2015 | Choi ................. | H02M 3/33561 |
| | | | 307/32 |
| 2020/0295581 A1 | 9/2020 | Li | |
| 2021/0083500 A1* | 3/2021 | Quek .................. | H02J 7/00712 |
| 2021/0167623 A1 | 6/2021 | Sanghvi et al. | |

OTHER PUBLICATIONS

Power Integrations; MIN1072M MinE-CAP Bulk Capacitor Miniaturization and Inrush Management IC With 750 V PowiGaN for Very High Power Density AC/DC Converters, available at https://www.power.com/sites/default/files/product_document/data_sheet/mine-cap_family_datasheet.pdf, available at least as of Jan. 14, 2022, pp. 1-14.
Chen, Y. et al., "Line Power Extension Method for Capacitor Reduction for AD-DC Application", 2018 IEEE Applied Power Electronics Conference and Exposition (APEC), 2018, pp. 2070-2076.

(Continued)

*Primary Examiner* — Samuel Berhanu
(74) *Attorney, Agent, or Firm* — Warner Norcross + Judd LLP

(57) ABSTRACT

A power sharing multiport charger or a power sharing multiport supply is provided. The power sharing may be provided via time division multiplexing of power output from a switch mode power supply.

6 Claims, 7 Drawing Sheets

(56)         References Cited

OTHER PUBLICATIONS

Xue, L. et al., "Active Clamp Flyback Using GaN Power IC for Power Adapter Applications", 2017 IEEE Applied Power Electronics Conference and Exposition (APEC), Tampa, FL, 2017, pp. 2441-2448.

Xue, L. et al., "Design considerations of Highly-Efficient Active Clamp Flyback Converter Using GaN Power ICs", 2018 IEEE Applied Power Electronics Conference and Exposition (APEC), San Antonio, TX, 2018, pp. 777-782.

Chen, K.-H., et al., "Design of Quasi-Resonant Flyback Converter Control IC with DCM and CCM Operation", 2014 International Power Electronics Conference (IPEC—Hiroshima 2014—ECCE Asia), Hiroshima, 2014, pp. 2750-2753.

Kim, J.-W. et al., "Dual Voltage Regulations of Single Switch Flyback Converter Using Variable Switching Frequency", 2016 IEEE Applied Power Electronics Conference and Exposition (APEC), 2016, pp. 1398-1402.

* cited by examiner

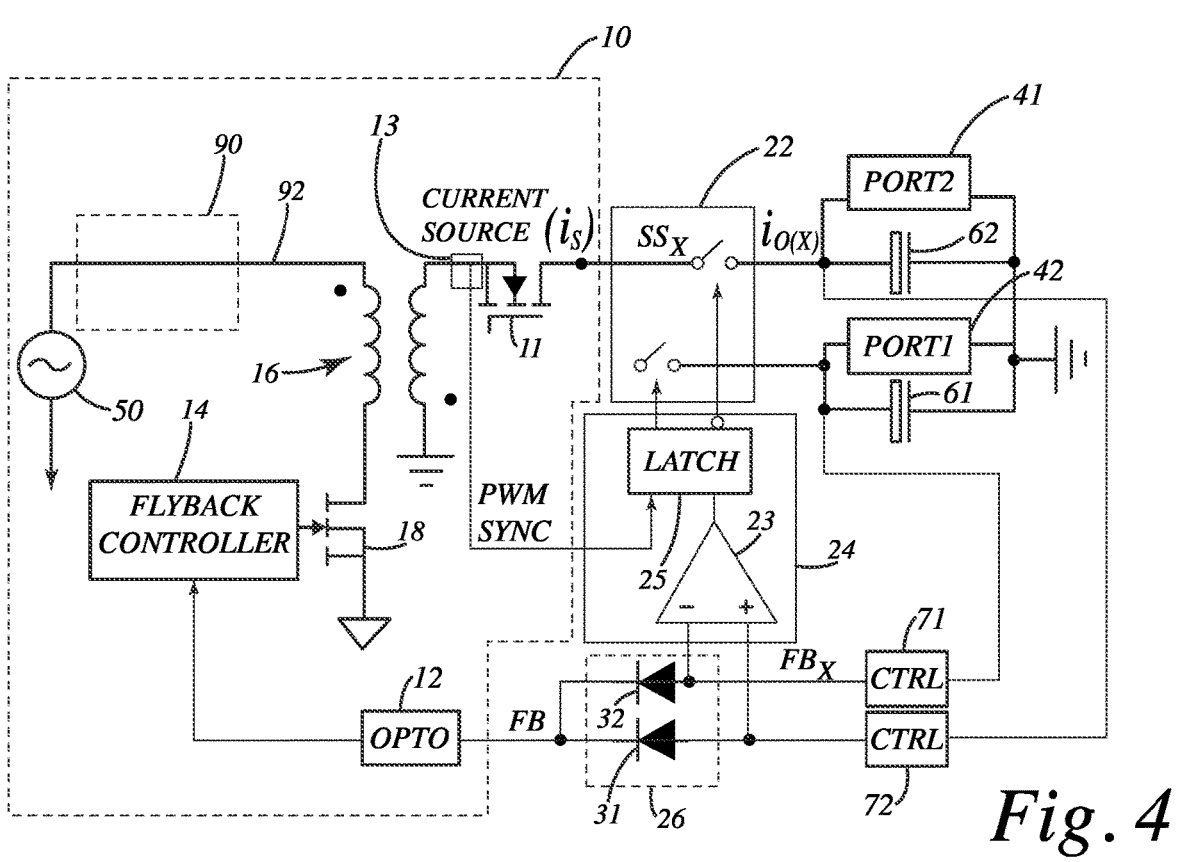
*Fig. 4*
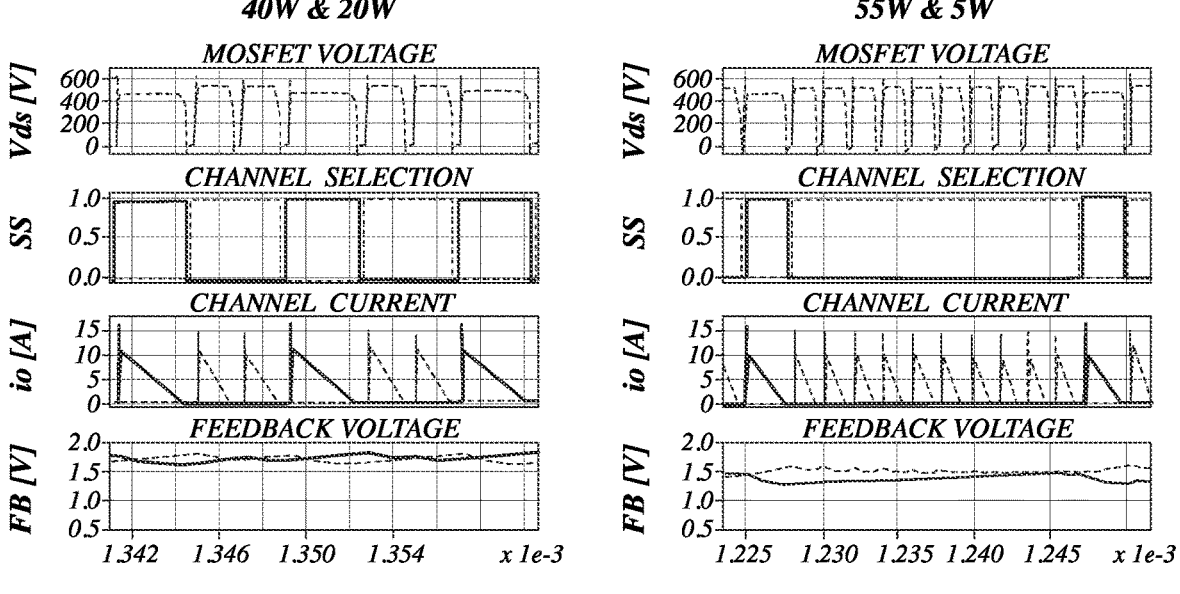
*Fig. 5*                  *Fig. 6*

MULTIPLE PORT POWER SUPPLY SYSTEM

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of power generation, and more particularly toward a power supply operable to supply power to multiple ports.

BACKGROUND

Universal Serial Bus Power Delivery (USB-PD) aims to unify fast charging protocols to a wide range of devices including smartphones, tablets, and laptops. A conventional USB-PD 3.0 compatible charger can support both wide input voltage range (90-264 V) and wide output voltage range (3-21 V) in continuous change at 20 mV step. Consumers often want multiple charging ports from a single unit to simultaneously charge multiple devices. Consumers often also want each charging port to be indistinguishable in charging performance regardless of whether other ports are plugged in. These parameters have a significant impact on power converter designs, with a particular effect on size constraint. Conventional efforts to adopt use of GaN semiconductors has driven the single-port charger performance in terms of power density, but multiple port designs remain lacking.

Conventional flyback converter designs are the most widely used converter topology for charger applications due in part to wide voltage range capability, simplicity, and low cost. The conventional flyback converter can be configured into multi-output flyback when equipped with multiple secondary windings. However, this conventional configuration often suffers from cross regulation and the lacks support for a wide, continuously-adjustable output.

SUMMARY

In general, one innovative aspect of the subject matter described herein can be embodied in In general, one innovative aspect of the subject matter described herein can be embodied in an apparatus for multi-port power delivery. The apparatus may include a switched-mode power supply configured to: receive an input AC voltage, and produce a sequence of pulses of equal energy. The apparatus may include two or more ports at which power is to be delivered at DC voltages specified by corresponding devices connected to the ports for charging, and time-division multiplexing circuitry configured to deliver, to the ports, power at respective levels that add to a maximum power corresponding to the sequence.

The time-division multiplexing circuitry may include port-monitoring circuitry configured to monitor variations in power needs of corresponding ports. The time-division multiplexing circuitry may include a multiplexer module configured to: a) receive the sequence, b) dispatch different integer numbers of pulses, as the sequence is being received, to corresponding ports in proportion to the respective power levels, c) switch the dispatching of pulses from one port to another based on the monitored variations in the power needs of the corresponding ports, and d) cause the switching to occur between the last pulse of each dispatch and the first pulse of the subsequent dispatch.

The switched-mode power supply may be configured to a) receive notification from the time-division multiplexing circuitry relating to an instant port to which pulses are being dispatched, and b) modify production of the pulses of the sequence in compliance with the DC voltage specification for the instant port.

The foregoing and other embodiments can each optionally include one or more of the following features, alone or in combination. In particular, one embodiment includes all the following features in combination.

In some embodiments, the time-division multiplexing circuitry may include a current sensing circuit configured to determine zero-current crossings corresponding to the sequence of pulses. The port-monitoring circuitry, for each port, may include a) a voltage sensing circuit configured to sense voltage at the port, and b) a compensator circuit.

The compensator circuit may be configured to compare the respective DC voltage specified for the port to its sensed voltage, and to produce a port-specific feedback signal indicative of the variations in power need of the port.

The multiplexer module, for each port, may include a switch (SSx) configured to allow pulses of the sequence to reach the port when open and to block pulses of the sequence from reaching the port when closed. The multiplexor module, for each port, may include a) a comparator configured to compare the port-specific feedback signal with the feedback signals of the remaining ports, and b) a latch. The latch may be configured to cause the switch to be open or closed based on the comparison, and synchronize each switching with an instantly determined zero-current crossing.

The time-division multiplexing circuitry may include an OR-ing circuit configured to select from among the port-specific feedback signals the one corresponding to the port having its switch open, and to cause the switched-mode power supply to modify its pulse production based on the selected port-specific feedback signal.

In some embodiments, the OR-ing circuit may include an array of low-current Schottky diodes in one-to-one correspondence with the ports.

In some embodiments, the switched-mode power supply may include a flyback converter.

In general, one innovative aspect of the subject matter described herein can be embodied in an AC/DC converter for universal serial bus (USB) power delivery (PD). The converter may include a converter apparatus described herein, where the two or more ports are USB ports.

In some embodiments, the AC/DC converter provides power sharing with respect to the two or more USB ports.

In general, one innovative aspect of the subject matter described herein can be embodied in a power supply including a switched-mode power supply operable to receive input power. The switched-mode power supply may include a switch operable to selectively generate output power based on the input power, and may be configured to selectively control the switch, based on a feedback signal, to generate the output power.

The power supply may include a first output port operable to supply first port power to a first external device, and a second output port operable to supply second port power to a second external device.

The power supply may include control circuitry operable to selectively direct the output power to the first and second output ports based on the first and second port power. The control circuitry may be configured to generate the feedback signal based on the first and second port power.

The foregoing and other embodiments can each optionally include one or more of the following features, alone or in combination. In particular, one embodiment includes all the following features in combination.

In some embodiments, the switched-mode power supply may include an inverter stage operable to receive the input power as AC power and to generate inverter DC power based on the AC power, where the switched-mode power supply may be configured to generate the output voltage based on the inverter DC power.

In some embodiments, the output power may correspond to a sequence of pulses generated by selective control of the switch.

In some embodiments, the control circuitry may selectively direct one or more first pulses of the sequence of pulses to the first output port to generate the first port power, and where the control circuitry selectively directs one or more second pulses of the sequence of pulses to the second output port to generate the second port power.

In some embodiments, the control circuitry, in a first mode, may selectively directs the output power to the first output port, and where, in the first mode, the feedback signal may correspond to the first port power associated with the first output port.

In some embodiments, the control circuitry, in a second mode, may selectively direct the output power to the second output port, and where, in the second mode, the feedback signal may correspond to the second port power associated with the second output port.

In some embodiments, the control circuitry, in the first mode, may selectively direct one or more first pulses of the sequence of pulses to the first output port, and where the control circuitry, in the second mode, may selectively direct one or more second pulses of the sequence of pulses to the second output port.

In some embodiments, the control circuitry may be configured to repeatedly transition between the first and second modes based on a first power demand of the first external device and a second power demand of the second external device.

In some embodiments, a sum of the first and second power demands may be less than a maximum power output for the switched-mode power supply.

In some embodiments, the control circuitry may be operable to conduct time-division multiplexing with respect to the sequence of pulses by repeatedly transitioning between the first and second modes.

In general, one innovative aspect of the subject matter described herein can be embodied in a power supply including a switched-mode power supply operable to receive input power. The switched-mode power supply may include a switch operable to selectively generate a sequence of pulses based on the input power. The switched mode power supply may be configured to selectively control the switch, based on a feedback signal, to generate the sequence of pulses.

The power supply may include a first output port operable to supply first port power to a first external device, and a second output port operable to supply second port power to a second external device.

The power supply may include control circuitry operable to direct the sequence of pulses to the first output port in a first mode. The control circuitry may be operable to direct the sequence of pulses to the second output port in a second mode. The control circuitry may be operable to repeatedly transition between the first and second modes based on a first power demand of the first external device and a second power demand of the second external device. The control circuitry may be configured to generate the feedback signal based on the first and second port power.

The foregoing and other embodiments can each optionally include one or more of the following features, alone or in combination. In particular, one embodiment includes all the following features in combination.

In some embodiments, the control circuitry may be configured to conduct time division multiplexing with respect to supply of pulses to the first and second output ports.

In some embodiments, a duty cycle of the sequence of pulses may vary based on the feedback signal.

In some embodiments, the feedback signal may be based on the first port power in the first mode, and where the feedback signal may be based on the second port power in the second mode.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 4 depicts a power supply apparatus in accordance with one embodiment.

FIG. 5 shows a plot of operating parameters of the power supply apparatus of FIG. 4.

FIG. 6 depicts a plot of operating parameters of the power supply apparatus of FIG. 4.

DETAILED DESCRIPTION

In one embodiment according to the present disclosure, a power supply may be configured as a power sharing multi-port charger or a power sharing multi port supply. Such a power supply may provide power sharing, efficiency, and sizing not available in conventional power supplies, such as a conventional flyback converter power supply. In one embodiment, the power supply may provide time division multiplexing (TDM) with respect to supply of power from a power source. TDM control methodologies described herein may be compatible with conventional quasi resonant (QR) flyback controllers, therefore enabling the power supply to utilize aspects of the conventional QR flyback controller, such as low switching loss, low electromagnetic interference (EMI), and enhanced light load management.

Figure 1:
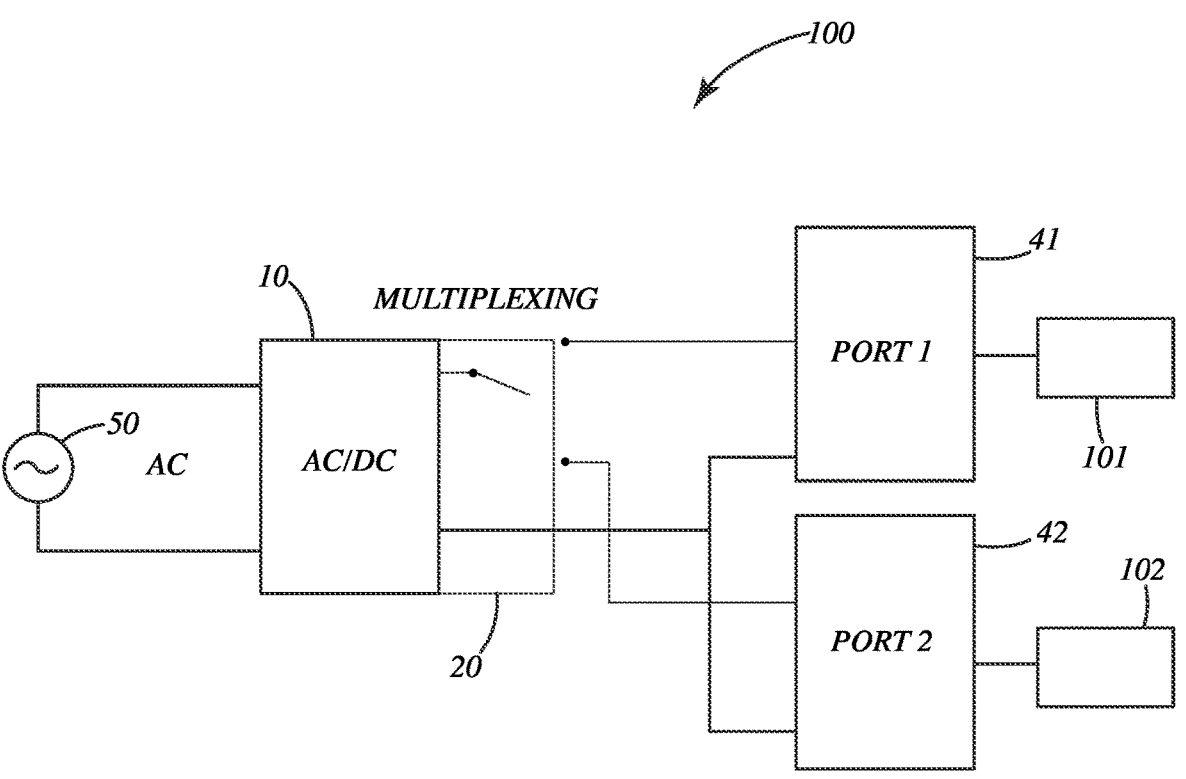
FIG. 1 shows a power supply apparatus in accordance with one embodiment.

A power supply apparatus in accordance with one embodiment is depicted in FIG. 1 and generally designated 100. The power supply apparatus 100 is configured to receive power from a power source 50, such as an AC or DC power source. The power supply apparatus 100 may include a switched mode power supply 10. In the case of the power source 50 being an AC power source, the switched mode power supply 10 may be configured to rectify or convert the AC power to DC power. The switched mode power supply 10 may include switching circuitry operable to convert and regulate the DC power for supply to one or more ports, such as a first port 41 and a second port 42. The one or more ports may be respectively coupled to one or more loads. For instance, the first port 41 may be coupled to a first load 101, and the second port 42 maybe coupled to a second load 102. The loads may be removably coupled to the ports of the power supply apparatus 100, such as via a connector (e.g., a USB connector). The power supply apparatus 100 may correspond to a USB power supply including a plurality of USB ports, which correspond to the ports 41, 42, 43. The USB device coupled to a respective port may correspond to a load.

The power supply apparatus 100 may include control circuitry 20 configured to multiplex output of the switched mode power supply 10 and feedback to the switch mode power supply 10, such that power output can be shared with respect to multiple output ports, such as the first and second ports 41, 42.

Figures 2, 3:
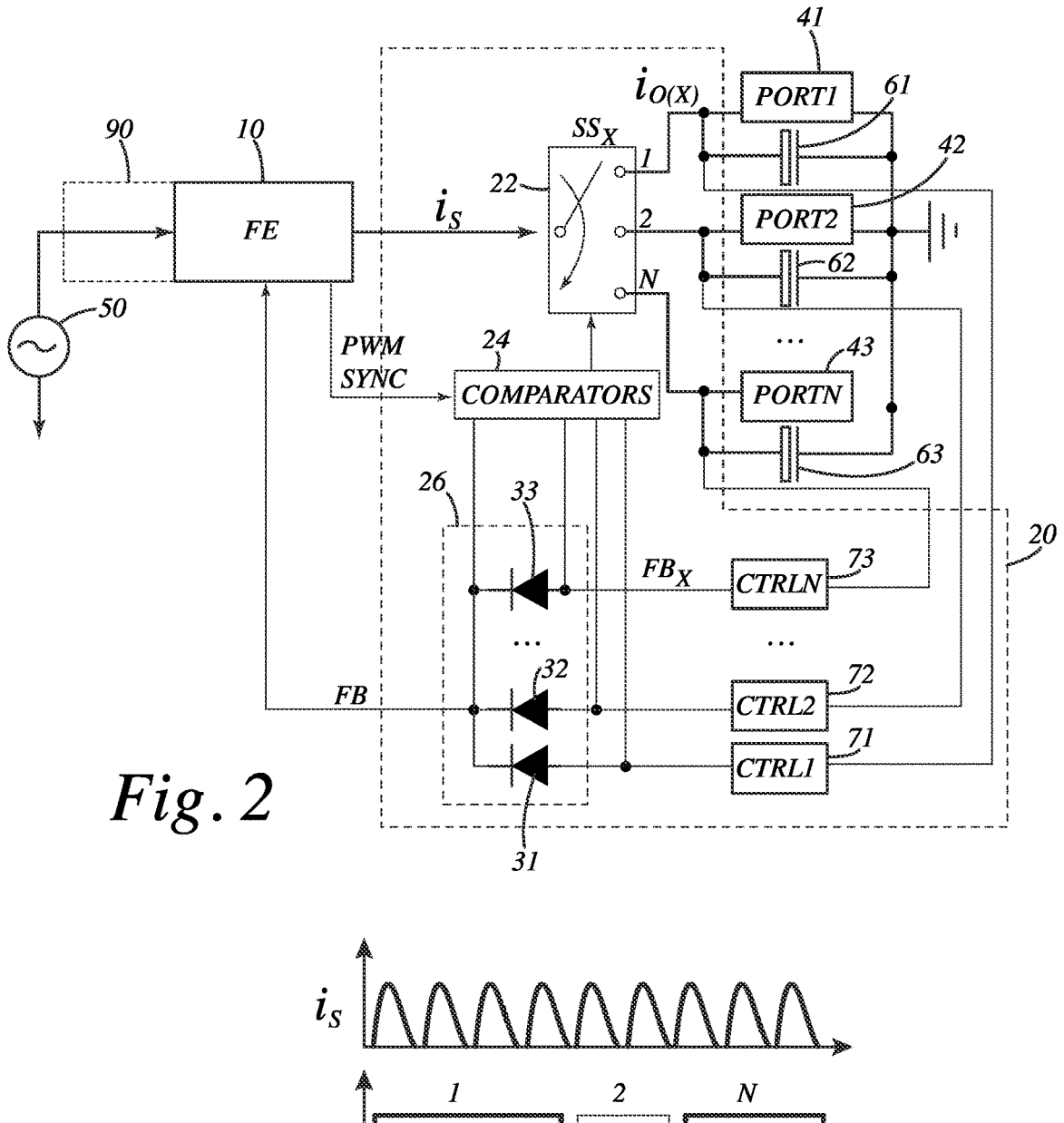
FIG. 2 shows a power supply apparatus in accordance with one embodiment.
FIG. 3 shows a plot of operating parameters of a power supply apparatus in accordance with one embodiment.
Figure 7:
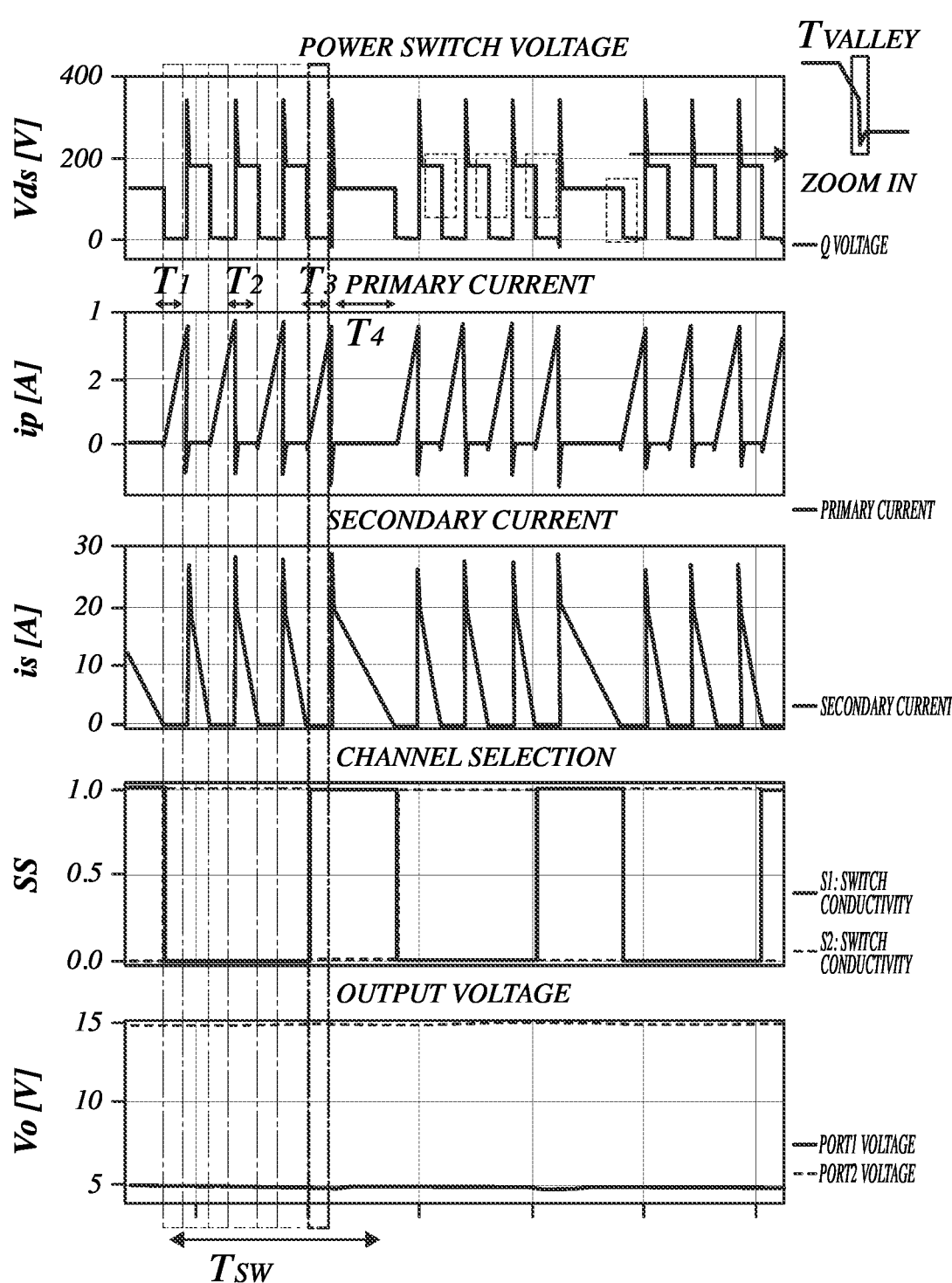
FIG. 7 shows a plot of operating parameters of a power supply apparatus in accordance with one embodiment.
Figure 8A:
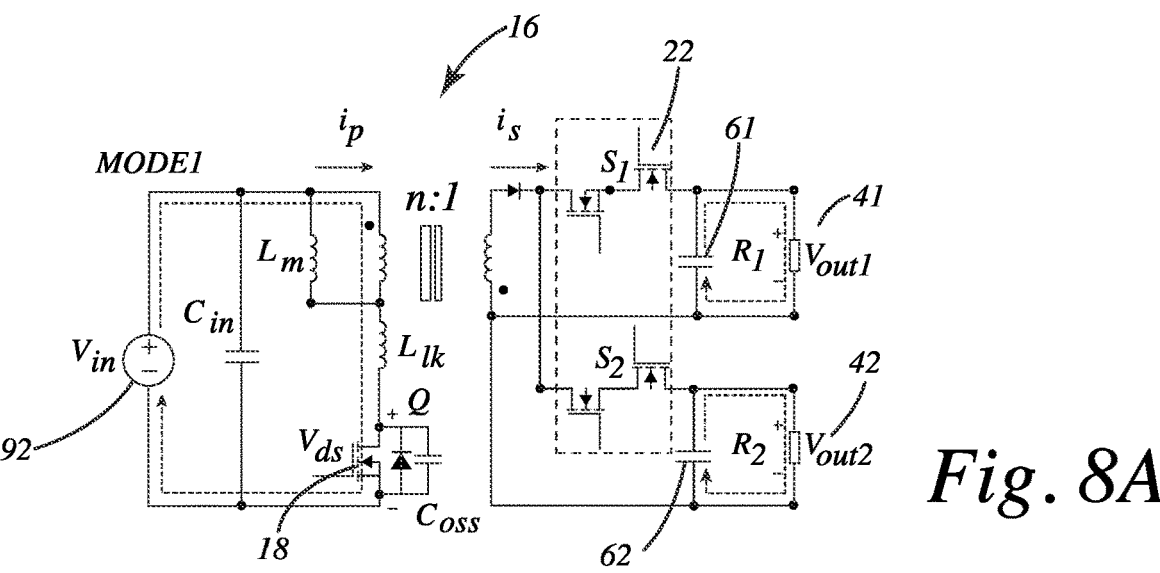
FIG. 8A shows a first mode of operation of a power supply apparatus.
Figure 8B:
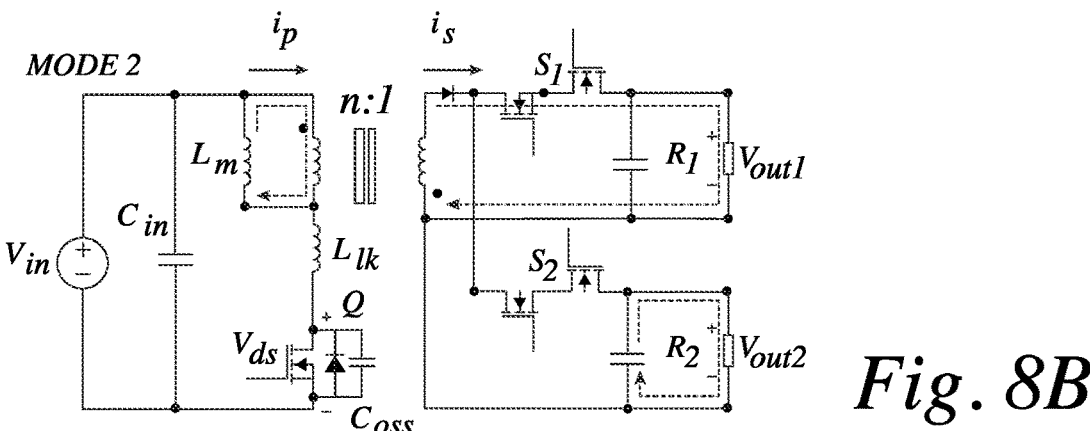
FIG. 8B shows a second mode of operation of a power supply apparatus.
Figure 8C:
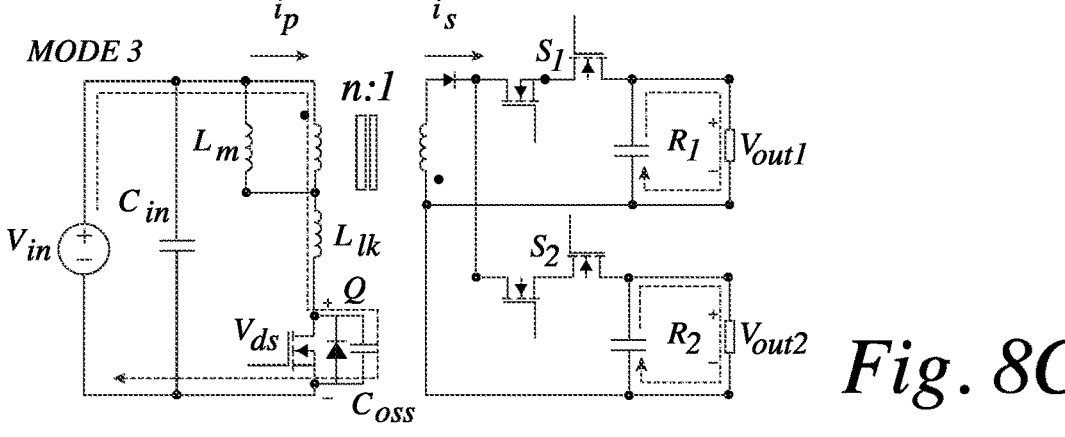
FIG. 8C shows a third mode of operation of a power supply apparatus.
Figure 8D:
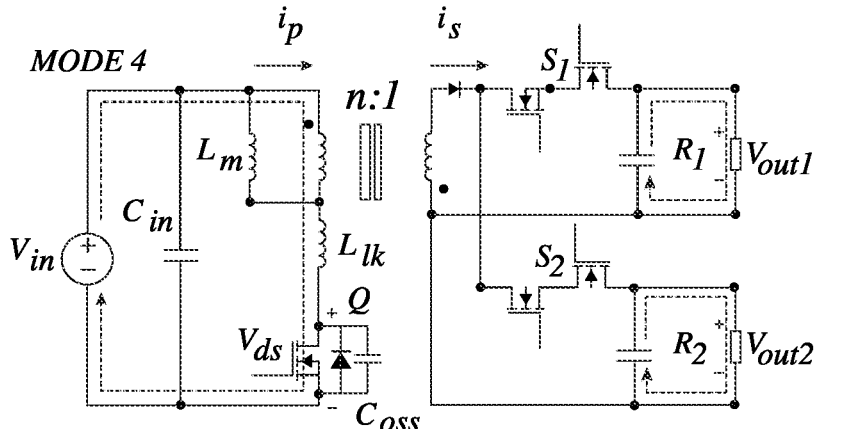
FIG. 8D shows a fourth mode of operation of a power supply apparatus.
Figure 8E:
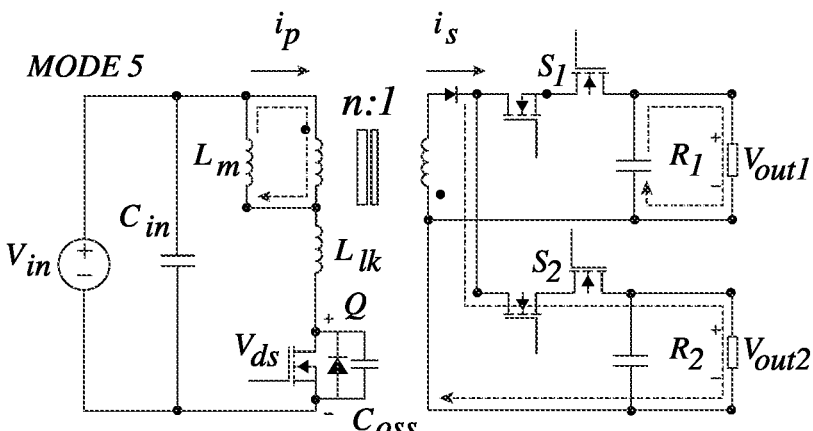
FIG. 8E shows a fifth mode of operation of a power supply apparatus.
Figure 8F:
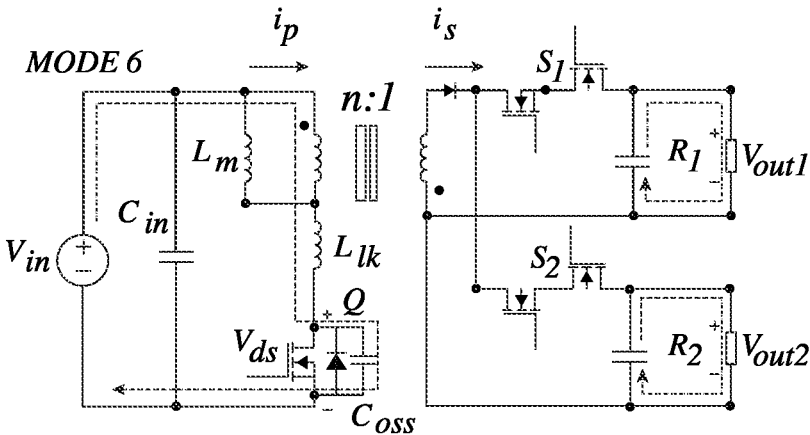
FIG. 8F shows a sixth mode of operation of a power supply apparatus.

A power supply apparatus 100 in accordance with one embodiment is shown in further detail in FIG. 2. The switched mode power supply 10 and the illustrated embodiment optionally includes an inverter 90 operable to convert AC power received from the power source 50 into DC power.

The control circuitry 20 in the illustrated embodiment includes switching circuitry 22, such as a multiplexer circuit, operable to selectively direct output from the switch to mode power supply 10 to one of the multiple output ports, such as one of first, second, or third ports 41, 42, 43. In the illustrated embodiment, the power supply apparatus 100 includes capacitors associated respectively with each of the ports, such as first, second, and third capacitors 61, 62, 63 respectively associated with the first, second, and third ports 41, 42, 43. The capacitors 61, 62, 63 may be decoupling capacitors and/or bulk capacitance to prevent output of supply from the port dropping too low during a period where current is not available or supplied to the respective port.

The power supply apparatus 100 may be configured such that each port may provide independent sensing and controls. Feedback signals FBx may be obtained with respect to each of the ports 41, 42, 43. Optionally, the feedback signals FBx may be conditioned respectively via conditioning circuitry 71, 72, 73. For instance, the conditioning circuitry 71, 72, 73 may filter or convert, or both, a signal obtained with respect to an associated port.

The feedback signals FBx in the illustrated embodiment may be provided to processing circuitry 26 operable to generate a single feedback signal to the switched mode power supply 10 in order to direct operation thereof. The processing circuitry 26 in the illustrated embodiment includes a plurality of diodes 31, 32, 33, which may operate together to OR the feedback signals FBx obtained with respect to the ports.

The control circuitry 20 may be operable to receive a synchronization signal output from the switch mode power supply 10. The synchronization signal may be used as a basis for controlling operation of the switching circuitry 22 in order to direct current from the switched mode power supply to one of the multiple ports 41, 42, 43. For instance, in the illustrated embodiment, the synchronization signal may be received by comparator circuitry 24 and facilitate achieving zero current switching with respect to the output of the switched mode power supply 10.

The control circuitry 20 in the illustrated embodiment includes comparator circuitry 24 operable to control operation of the switching circuitry 22. The comparator circuitry 24 may obtain the feedback signals FBx. The comparative circuitry 24 may optionally obtain the feedback signal FB provided to the switched mode power supply 10. One or more of these signals (feedback signals FBx and feedback signal FB) may be used as a basis, optionally in conjunction with the synchronization signal, for directing operation of the switching circuitry 22.

A timing diagram showing operation of the power supply apparatus 100 in FIG. 2 is shown in FIG. 3. The timing diagram shows the output current $i_s$ from the switched mode power supply 10 and the output current $i_o$ of the switching circuitry 22 relative to the state of the switching circuitry 22 and the feedback signal FB provided to the switched mode power supply 10. As can be seen, the switching circuitry 22 may selectively direct output current $i_s$ from the switch mode power supply 10 to one of the first, second, or third ports 41, 42, 43. In another embodiment, identical energy pulses from the switched mode power supply 10 may be provided to each of the ports 41, 42, 43. The power delivered to each of the ports 41, 42, 43 may depend on the number of pulses dispatched for an individual channel. For example, with respect to the second port 42, two pulses are provided in FIG. 3 and therefore the power delivered to the second port corresponds to the amount of power associated with the two pulses. The number of pulses may vary based on the power demands of the associated port. The power demands of the associated port may be determined by the device being charged or powered at the port. For instance, a smart phone can request 18 W of power at the fastest charging phase, but may reduce the power to 5 W or even lower if it is close to fully charged. It should be understood that the power demand determination is not limited to the device determining the power demand, and that the power demands may be determined differently depending on the application, including, for example, by the power supply apparatus 100.

Additionally, it is noted that the sequence 1, 2, N depicted in FIG. 3 for the switching circuitry 22 may be repeated for multiple sequence periods. Further, it is noted that the sequence need not include supplying pulses to all of the available ports of the power supply apparatus 100. The sequence for one sequence period may be different from the sequence for another sequence. For instance, for a first sequence period, the sequence may correspond to 1, 2 and, for a second sequence period, the sequence may correspond to 1, 2, N. Example reasons for skipping a port during a sequence include no load or a light load being associated with a port.

A two port embodiment of the power supply apparatus 100 is depicted in the illustrated embodiment of FIG. 4, along with circuitry of the switched mode power supply 10 and the comparator circuitry 24 shown in further detail. Specifically, the comparator circuitry 24 in the illustrated embodiment includes a latch 25 and a comparator 23 operable to compare feedback signals FBx associated respectively with the first and second ports 41, 42. The latch 25 may be configured to synchronize operation of the switching circuitry 22 with the synchronization signal output from the switched mode power supply 10. The synchronization signal may correspond to an output 13 of a transformer 16 prior to being controlled by a switch 18 of the switched mode power supply 10. Zero current switching may be achieved via such synchronization.

In the illustrated embodiment, the switched mode power supply 10 includes flyback controller 14, which may be a conventional flyback controller, operable to control a switch 18 coupled to a transformer 16. The flyback controller 14 may be responsive to the feedback signal FB generated from the control circuitry 20. The switched mode power supply 10 may include an opto-isolator 12 operable to galvanically isolate the switch mode power supply circuitry from control circuitry 20 and the ports 41, 42. The switched mode power supply may include a DC voltage rail 92 corresponding to the output of rectifier circuitry 90 and supplied to an input of the transformer 16. As noted above, the switch mode power supply 10 may include a switch 11 operable to control current output from the switch mode power supply 10. Switch 11 may be controlled as a synchronous rectifier for which the switch turns ON in the present of current flowing from its source to drain terminals and turns off when this current drops to zero or reversed. Switch 11 can also be replaced by a diode for lower cost without substantially affecting the operation. Using a diode may result in higher power loss due to higher voltage drop of the diode, in comparison with using a switch operated in synchronous rectification mode. Channel selection and operational conditions for the power supply apparatus 100 and illustrated embodiment of FIG. 4 are shown in FIGS. 5 and 6 for different load conditions. For instance, FIG. 5 depicts operational parameters and sequencing for the switching circuitry 22 for 40 W and 20 W loads coupled to the first and second ports 41, 42. And, FIG. 6 depicts operational parameters and sequencing for the switching circuit 22 for 55 W and 5 W loads coupled to the first and second ports 41, 42. As can be seen, the higher power port conducts for a longer duration. For the two different operating conditions and FIGS. 5 and 6, similar feedback signals FB and peak current of total output power may remain substantially the same. Additionally, it can be seen at valley switching at the primary switch 18 is provided.

The flyback converter, in the form of the switch mode power supply 10, operated under quasi resonant conditions, such as a boundary conduction mode, may be adopted for high efficiency due to low switching losses. Depending on the output power requirements, each port or channel may have individual control reference targets to compare with its sensed voltage. The conditioning circuitry 71, 72 (EG compensation circuitry) in turn may generate independent feedback signals FBx for each of the associated ports 41, 42. The final feedback signal may be obtained via the processing circuitry 26 via OR'ing the two feedback signals FBx. The processing circuitry 26 in the illustrated embodiment may implement low current Shottkey diodes. The feedback signals FBx may be compared, and the port 41, 42 with higher feedback signal FBx voltage may have its associated switch of the switching circuitry 22 turned on to accept power from the flyback output of the switched mode power supply 10.

Due to the OR'ing connection of the feedback signals FBx, the feedback signal FB seen by the flyback controller 14 (e.g., PWM controller) may be a stable voltage. Because the voltage of the feedback signal FB may be used as a reference for the flyback peak current mode control period, the primary side transformer peak current $I_p$ may stay almost constant regardless of the toggling of channel or port selections. Similarly, the secondary side of the transformer 16 may exhibit a series of current pulses with stable peak values. Because these current pulses represent the energy stored and released in the flyback inductance $L_p$ as individual packet energy, the "energy packets" may be distributed to the specific port whose channel selection switch of the switching circuitry 22 is ON.

The primary side peak current $I_p$ may change with operating conditions, so as the amount of energy carried in each packet. The size of the energy packet may be adapted to the operating condition automatically according to the feedback voltage level of the feedback signal FB. This may be helpful in the case of a light load condition, where smaller energy packets may be more efficient due to lower RMS current values and less conduction losses. packet dispatching may be automatically realized by the control circuitry 20. This multiplexing of control can respond automatically to the power demand of the ports, where the more power hungry port obtains higher numbers of energy packets.

The power supply apparatus 100 in one embodiment may provide zero current switching (ZCS) for the switching circuitry 22 (e.g., the channel switches SSx). During channel transition, and active channel may be disconnected from the flyback first, and the other channel may be turned on after a short period of time, e.g., dead time, in order to avoid shoot through of two channel switches. However, if the active channel switch is turned off when the transformer secondary current is present, the interruption of this inductor current may generate a high voltage spike across the channel switch and cause overvoltage damage. To avoid this, the channel switching transition maybe controlled to occur when the transformer current becomes zero. This can be achieved via the synchronization signal as described herein.

The comparator output of the comparative circuitry 24 in one embodiment may not directly flip the port selection switch of the switching circuitry 22. Instead, the voltage level may be latched and the port selection signal may become active after the secondary current drops to zero. The latch 25 may be edge triggered by the synchronization signal that indicates a zero crossing of the secondary current.

For a quasi-resonant flyback converter, the zero crossing of the transformer and recurrence may be detected through an auxiliary winding and may be synchronized with the flyback PWM (e.g., the flyback controller 14) to achieve boundary mode conduction. The secondary side transformer voltage 13, e.g., shown provided as an input to the latch 25, may indicate the current zero-crossing with a tunable delay. This sensing method may be cost effective compared to an additional or auxiliary winding. Alternatively, an isolator or optocoupler may be provided in place of the secondary side transformer voltage or an auxiliary winding. This isolator or optocoupler may provide the PWM information across the isolation barrier from the primary to secondary side.

The power sharing aspect of the power supply apparatus 100 in accordance with one embodiment is shown in further detail with respect to FIGS. 7 and 8A-8F. The power supply apparatus 100 for the operational aspects depicted in FIGS. 7 and 8A-8F corresponds to a two channel or two port configuration, with first and second ports 41, 42. The switch mode power supply 10 is partially shown including a DC rail voltage 92, a switch 18, and the transformer 16. The switching circuitry 22 is depicted in conjunction with the control circuitry 20, along with capacitor 61, 62 and the first and second ports 41, 42. The power supply apparatus 100 in the illustrated embodiments of FIGS. 8A-8F is shown being operated according to one of six modes as follows: Mode 1-FIG. 8A, Mode 2-FIG. 8B, Mode 3-FIG. 8C, Mode 4-FIG. 8D, Mode 5-FIG. 8E, and Mode 6-FIG. 8F. The current path during each mode is shown in the illustrated embodiments. The power supply apparatus in the illustrated embodiments includes a bulk capacitance $C_{in}$. This bulk capacitance $C_{in}$ may be associated with a rectifier (not shown). An example configuration of the bulk capacitance is described in U.S. Patent Application entitled SYSTEM FOR BULK CAPACITANCE REDUCTION, filed on the same day as this application, to Xue and claiming priority to U.S. Application No. 63/299,517—the disclosure of which is hereby incorporated by reference in its entirety.

For each switching cycle, the ratio m between the output power of port 41 and port 42 is defined as follows:

$$m = P_{out1}/P_{out2}$$

Mode 1[$T_1$]: The switch 18 on the primary side may be turned on while switches S1, S2 of the switching circuitry 22 are turned off. In the illustrated embodiment, the switches S1, S2 are connected back-to-back to block by directional voltage. The output capacitance 61, 62 may provide energy separately to loads 101, 102 respectively coupled to the first and second ports 41, 42. The magnetizing inductor $L_m$ of the transformer 16 may be charged in the peak current $I_{p(pk)}$ in $L_m$ can be expressed as follows:

$$Ip(pk) = \frac{v_{in}}{L_p}T_1$$

Mode 2[$T_2$]: The switch 18 on the primary side may be turned off. S1 is on, while S2 is off. The port 41 may absorb energy from the primary side. The drain source voltage spike $V_{ds(max)}$ can be expressed as follows:

$$V_{ds(max)} = V_{in} + nV_{out1} + I_{Lp}(pk)\sqrt{\frac{L_{1k}}{C_{oss}}}$$

When the resonant energy stored in $L_{lk}$, which is part of the transformer 16, and output capacitance $C_{oss}$ associated with the switch 18 reaches zero, $V_{ds}$ drops to a constant voltage and can be expressed as follows:

$$V_{ds} = V_{in} + nV_{out1}$$

The primary peak current $I_{p(pk)}$ can be derived according to the following:

$$I_p(pk) = \frac{nV_{out1}}{L_p}T_2$$

Mode 3[$T_{valley}$]: The switch statuses of switches 18, S1 and S2 remain the same as in Mode 2. When the secondary side does not transmit current, the primary side behaves as an RLC resonant circuit and the flyback converter enters the resonance state:

$$v_{ds}(t) = v_{in} + nv_{out}e^{\frac{-R_pt}{2L_m}}\cos\left(2\pi\frac{t}{2\pi\sqrt{L_mC_{oss}}}\right)$$

When $V_{ds}$ reaches the valley voltage, the primary side switch 18 may be turned on. The valley side switching time can be expressed as follows:

$$T_{valley} = \pi\sqrt{L_mC_{oss}}$$

Based on the power ratio m between the output power of port 41 and port 42, the port 41 may repeat Mode 1 to Mode 3 in m times and then the power delivers to port 42.

Mode 4[$T_3$]: The switch 18 on the primary side may be turned on while switches S1 and S2 are turned off. The magnetizing inductor $L_m$ of the transformer 16 may be charged and the peak current in $L_m$ may be expressed as follows:

$$I_p(pk) = \frac{V_{in}}{L_p}T_3$$

Mode 5[$T_4$]: The switch 18 on the primary side maybe turned off. The switch S1 is off, while the switch S2 is on. The $V_{ds(max)}$, $V_{ds}$ and peak primary current $I_{p(pk)}$ can be expressed as follows:

$$v_{ds(max)} = V_{in} + nV_{out2} + I_{Lp}(pk)\sqrt{\frac{L_{1k}}{C_{oss}}}$$

$$V_{ds} = V_{in} + nV_{out2}$$

$$I_p(pk) = \frac{nV_{out2}}{L_p}T_3$$

Mode 6 [$T_{valley}$]: The switch statuses of the switches 18, S1, S2 remain the same as Mode 5. When the secondary side does not transmit current, the primary side behaves as an RLC resonant circuit and the flyback converter enters the resonant state:

$$v_{ds}(t) = v_{in} + nV_{out2}e^{\frac{-R_pt}{2L_m}}\cos\left(2\pi\frac{t}{2\pi\sqrt{L_mC_{oss}}}\right)$$

The first valley switching time can be expressed as follows:

$$T_{valley} = \pi\sqrt{L_mC_{oss}}$$

As a result, the switch $T_{sw}$ and the input power can be derived using the following equations, assuming no power loss incurred:

$$T_{sw} = mT_1 + T_2 + mT_3 + T_4 + (m+1)T_{valley}$$

$$p_{in} = P_{out1} + p_{out2} = (m+1)\frac{1}{2}L_p I_p(pk)^2 \frac{1}{T_{sw}}$$

Figures 9, 10:
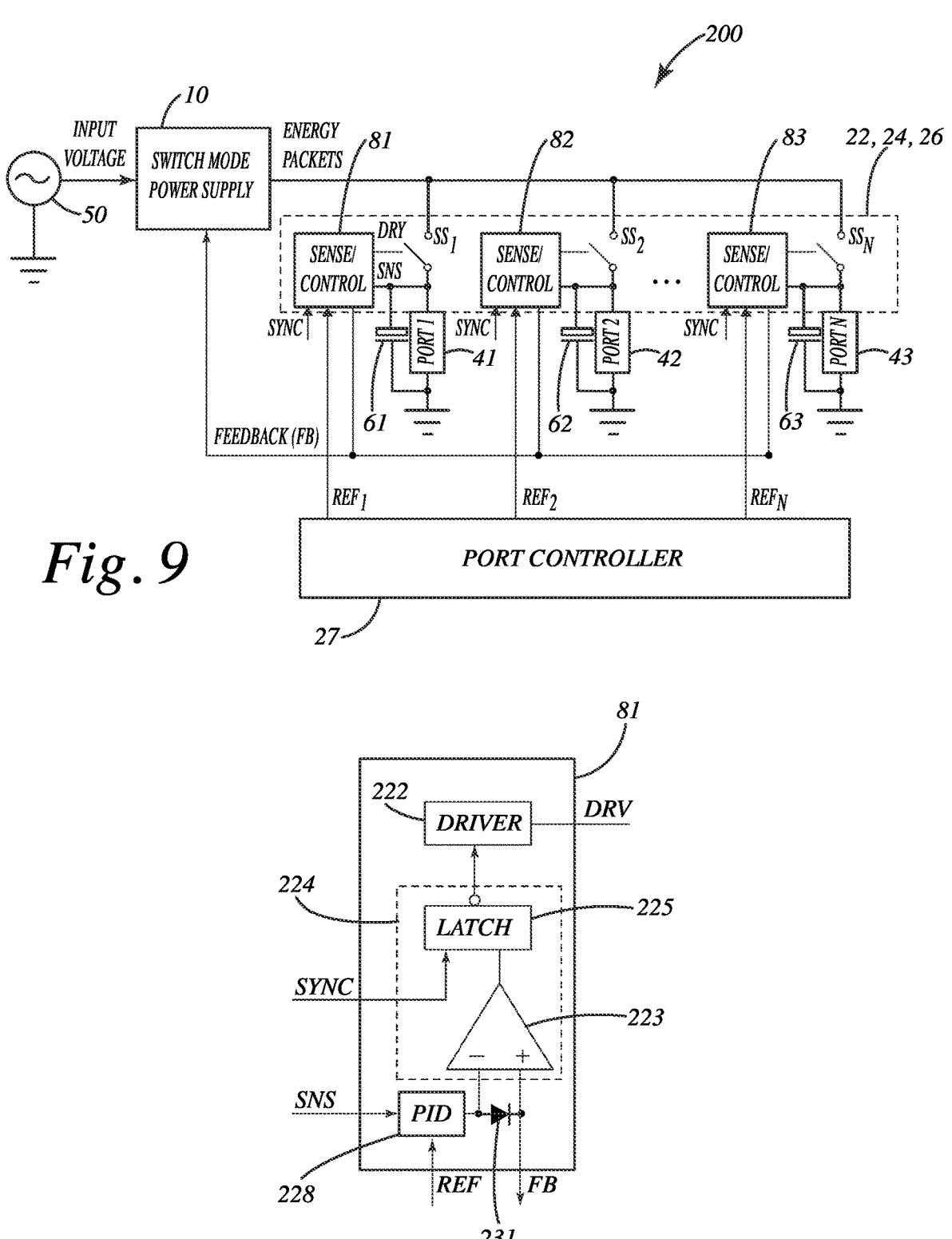
FIG. 9 shows a power supply apparatus in accordance with one embodiment.
FIG. 10 depicts a port controller in accordance with one embodiment.

A multiple port configuration of a power supply apparatus in accordance with one embodiment is depicted in FIG. 9 and generally designated 200. The power supply apparatus 200 is similar to the power supply apparatus 100 described herein but with several exceptions. For instance, the power supply apparatus 200 includes a switched mode power supply 10 operable to generate energy packets based on power received from a power source 50, similar to the power supply apparatus 100. The power supply apparatus 200, however, may include individual sensing and/or control over supply of power to the respective ports 41, 42, 43. A controller 27 may be operable to supply reference signals to respective port controllers 81, 82, 83. For instance, based on the reference signals generated by the controller 27, the port controllers made direct operation of the associated switches S1, S2, SN with the respective first, second, and third ports 41, 42, 43. The port controllers 81, 82, 83 may receive a synchronization signal similar to the synchronization signal described in conjunction with the power supply apparatus 100. The port controllers 81, 82, 83 may communicate with each other to synchronize operation and control over which of the switches S1, S2, SN and associated port 41, 42, 43 is active. Alternatively, the port controllers 81, 82, 83 may be a single controller system that obtains reference signals and information with respect to each of the ports 41, 42, 43.

The port controller 81 is shown in further detail in the illustrated embodiment of FIG. 10. The port controllers 82, 83 may be similar to the port controller 81. The port controller 81 includes a driver circuit operable to direct operation of a port switch, such as the port switch S1. The port controller 81 may also include comparator circuitry 224, which may include a latch 225 operable to facilitate synchronized activation of the switch as one based on the synchronization signal received from the switched mode power supply 10. The comparator circuitry 224 may include a comparator 223 with inputs coupled to a) an output of a controller 228, such as a PID controller and b) the feedback signal FB. The feedback signal FB may be coupled to each of the port controllers 81, 82, 83 in a similar manner such that the feedback signal FB corresponds to the port that is active and to prevent simultaneous activation of a port. The controller 228 may receive the reference signal from the controller 27 and a sensed signal with respect to the port (e.g., similar to the feedback signal FBx described in connection with the power supply apparatus 100).

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. An apparatus for multi-port power delivery, the apparatus comprising:

a switched-mode power supply configured to:

receive an input AC voltage, and produce a sequence of pulses of equal energy;

two or more ports at which power is to be delivered at DC voltages specified by corresponding devices connected to the ports for charging; and time-division multiplexing circuitry configured to deliver, to the ports, power at respective levels that add to a maximum power corresponding to the sequence, wherein the time-division multiplexing circuitry includes:

port-monitoring circuitry configured to monitor variations in power needs of corresponding ports, and a multiplexer module configured to:

receive the sequence, dispatch different integer numbers of pulses, as the sequence is being received, to corresponding ports in proportion to the respective power levels, switch the dispatching of pulses from one port to another based on the monitored variations in the power needs of the corresponding ports, and cause the switching to occur between the last pulse of each dispatch and the first pulse of the subsequent dispatch, wherein the switched-mode power supply is configured to:

receive notification from the time-division multiplexing circuitry relating to an instant port to which pulses are being dispatched, and modify production of the pulses of the sequence in compliance with the DC voltage specification for the instant port.

2. The apparatus of claim 1 wherein:

the time-division multiplexing circuitry includes a current sensing circuit configured to determine zero-current crossings corresponding to the sequence of pulses, the port-monitoring circuitry, for each port, includes:

a voltage sensing circuit configured to sense voltage at the port, and a compensator circuit configured to:
  compare the respective DC voltage specified for the port to its sensed voltage, and
  produce a port-specific feedback signal indicative of the variations in power need of the port,
the multiplexer module, for each port, includes:
  a switch configured to:
    allow pulses of the sequence to reach the port when open, and
    block pulses of the sequence from reaching the port when closed,
  a comparator configured to compare the port-specific feedback signal with the feedback signals of the remaining ports, and
  a latch configured to
    cause the switch to be open or closed based on the comparison, and
    synchronize each switching with an instantly determined zero-current crossing, and
the time-division multiplexing circuitry includes an OR-ing circuit configured to:

select from among the port-specific feedback signals the one corresponding to the port having its switch open, and
cause the switched-mode power supply to modify its pulse production based on the selected port-specific feedback signal.

3. The apparatus of claim 2 wherein the OR-ing circuit comprises an array of low-current Schottky diodes in one-to-one correspondence with the ports.

4. The apparatus of claim 1 wherein the switched-mode power supply includes a flyback converter.

5. An AC/DC converter for universal serial bus (USB) power delivery (PD), the converter comprising:
  the apparatus of claim 1,
  wherein the two or more ports are USB ports.

6. The AC/DC converter for USB PD of claim 5 wherein the AC/DC converter provides power sharing with respect to the two or more USB ports.

* * * * *